US009398261B1

(12) United States Patent
Pfeffer et al.

(10) Patent No.: US 9,398,261 B1
(45) Date of Patent: Jul. 19, 2016

(54) TRANSITIONING VIDEO CALL BETWEEN DEVICES

(75) Inventors: Howard Pfeffer, Reston, VA (US); Matthew Cannon, Reston, VA (US)

(73) Assignee: TIME WARNER CABLE ENTERPRISES LLC, New York, NY (US)

(*) Notice: Subject to any disclaimer, the term of this patent is extended or adjusted under 35 U.S.C. 154(b) by 750 days.

(21) Appl. No.: 13/554,728

(22) Filed: Jul. 20, 2012

(51) Int. Cl.
*H04N 7/14* (2006.01)
*H04N 7/15* (2006.01)

(52) U.S. Cl.
CPC ...................................... *H04N 7/157* (2013.01)

(58) Field of Classification Search
None
See application file for complete search history.

(56) References Cited

U.S. PATENT DOCUMENTS

| 2003/0056217 | A1 | 3/2003 | Brooks | |
|---|---|---|---|---|
| 2004/0207719 | A1* | 10/2004 | Tervo | H04M 1/7253 348/14.02 |
| 2006/0130107 | A1 | 6/2006 | Gonder | |
| 2007/0217436 | A1 | 9/2007 | Markley | |
| 2011/0264817 | A1* | 10/2011 | Raveendran | H04M 3/5307 709/230 |
| 2012/0013703 | A1* | 1/2012 | Maeng et al. | 348/14.02 |
| 2012/0038550 | A1* | 2/2012 | Lemmey | A63F 13/12 345/156 |
| 2012/0066722 | A1* | 3/2012 | Cheung | H04M 1/7253 725/62 |
| 2013/0162502 | A1* | 6/2013 | Lee | G09G 5/003 345/1.2 |
| 2013/0342637 | A1* | 12/2013 | Felkai | H04N 7/14 348/14.08 |

OTHER PUBLICATIONS

Robert Todd Smith, "Transitioning Video Between Television and Tablet Computer or the Like". U.S. Appl. No. 13/355,925, filed Jan. 23, 2012.
"Videoconferencing", downloaded from http://en.wikipedia.org/wiki/Videoconferencing on Apr. 28, 2012.
"Session Initiation Protocol", downloaded from http://en.wikipedia.org/wiki/Session_initiation_protocol on Apr. 28, 2012.
"Skype", downloaded from http://en.wikipedia.org/wiki/Skype on Apr. 28, 2012.

\* cited by examiner

*Primary Examiner* — Maria El-Zoobi
(74) *Attorney, Agent, or Firm* — Otterstedt, Ellenbogen & Kammer, LLP

(57) ABSTRACT

A flip signal is received from a first device, at a signaling server, during a video chat between the first device and a second device. The flip signal indicates that media packets from the second device intended for the first device are to be sent to a third device. Responsive to the signaling server receiving the flip signal, the signaling server sends a call request to the third device; and the signaling server sends a message to the second device to cause the second device to send the media packets to the third device. In another aspect, at the first device, during the video chat, a gesture is detected which indicates that media packets from the second device intended for the first device are to be sent to the third device; and, responsive to the detecting, the flip signal is sent.

20 Claims, 9 Drawing Sheets

TRANSITIONING VIDEO CALL BETWEEN DEVICES

FIELD OF THE INVENTION

The present invention relates generally to communications systems and methods, and, more particularly, to techniques for video calling and the like.

BACKGROUND OF THE INVENTION

At one time, the cable network was predominantly a vehicle for delivering entertainment. With the advent of the Internet and the rise in demand for broadband two-way access, the cable industry began to seek new ways of utilizing its existing plant. Pure coaxial ("coax") cable networks were replaced with hybrid fiber networks (HFNs) using optical fiber from the head end to the demarcation with the subscriber coax (usually at a fiber node). Currently, a content-based network, a non-limiting example of which is a cable television network, may afford access to a variety of services besides television, for example, broadband Internet access, telephone service, and the like. The existing cable network topology was originally optimized for downstream (toward the subscriber) only service. New equipment was added to the network to provide two-way communication.

One example of a service that may be implemented in a variety of contexts, including over a content-based network that also offers data services, is Internet telephony, including Voice over Internet Protocol (VoIP), optionally with video and/or instant messaging. A non-limiting example is the SKYPE® service (registered mark of Skype Corporation, Dublin, Ireland).

SUMMARY OF THE INVENTION

Principles of the present invention provide a mechanism for transitioning a video call between devices or the like. In one aspect, an exemplary method includes the step of receiving, at a signaling server, during a video chat between a first device and a second device, a flip signal from the first device. The flip signal indicates that media packets from the second device intended for the first device are to be sent to a third device. Additional steps include, responsive to the signaling server receiving the flip signal, the signaling server sending a call request to the third device; and the signaling server sending a message to the second device to cause the second device to send the media packets to the third device.

In another aspect, a signaling server includes a memory; and at least one processor, coupled to the memory, and operative to carry out or otherwise facilitate the method steps just described.

In still another aspect, another exemplary method includes the steps of detecting, at a first portable computing device, during a video chat between the first portable computing device and a second device, a gesture which indicates that media packets from the second device intended for the first device are to be sent to a third device; and, responsive to the detecting, sending a flip signal from the first portable computing device to a signaling server. The flip signal indicates that the media packets from the second device intended for the first device are to be sent to the third device.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code for performing the method steps indicated. Furthermore, one or more embodiments of the invention or elements thereof can be implemented in the form of an apparatus including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments enable a person viewing video on a small screen device to transition the video to a large screen device; this is of use, for example, to visually impaired individuals.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Embodiments of the invention may be implemented in a variety of contexts. Purely by way of example and not limitation, embodiments will be shown in the context of a cable multi-service operator (MSO) providing data services as well as entertainment services. However, one or more embodiments are broadly applicable to any broadband Internet Protocol (IP) network; other non-limiting examples of same include a fiber to the curb (FTTC) or fiber to the premises (FTTP) network, wireless broadband, and the like.

Figure 1:
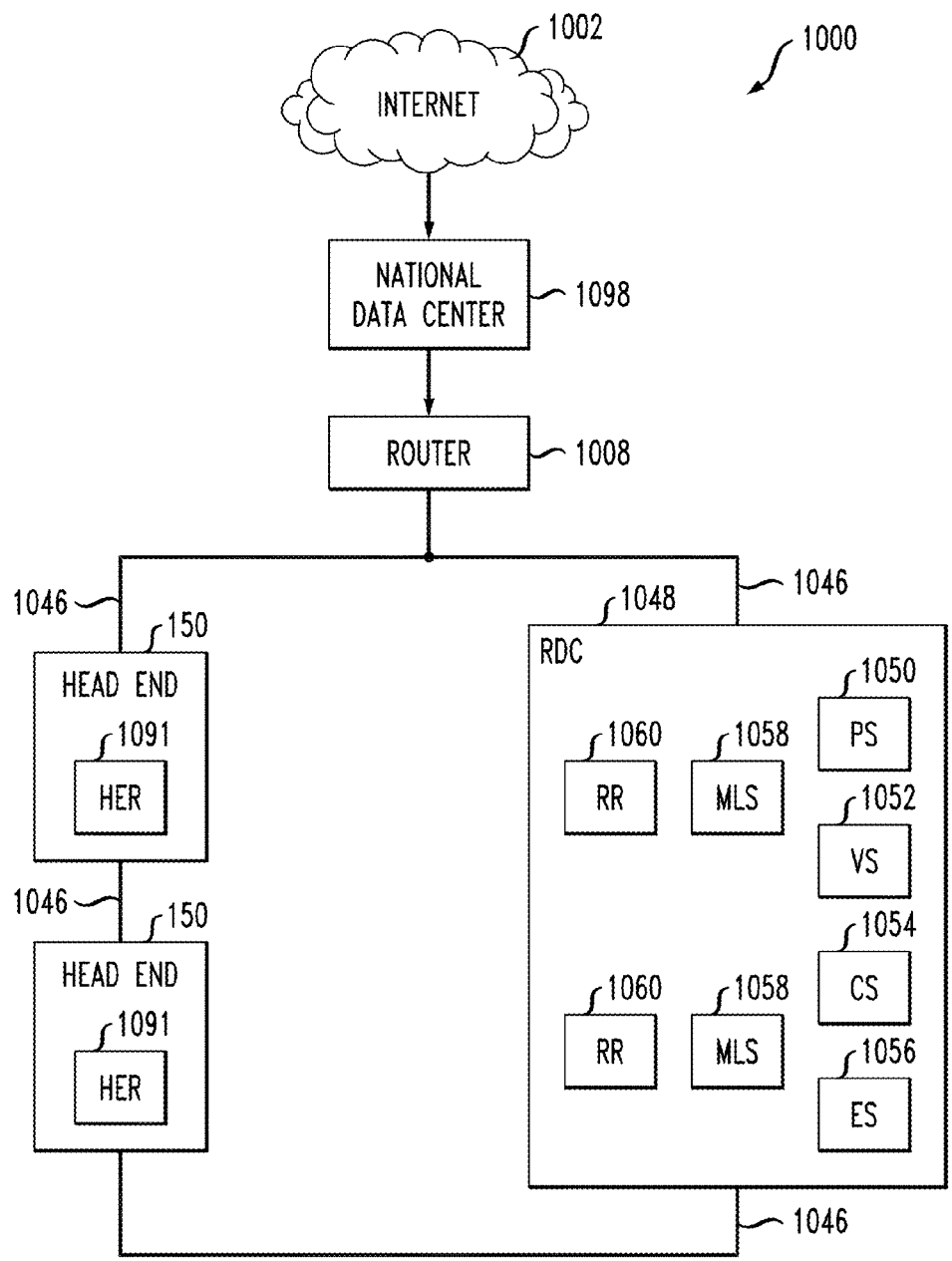
FIG. 1 is a block diagram of an exemplary embodiment of a system, within which one or more aspects of the invention can be implemented.

FIG. 1 shows an exemplary system 1000, according to an aspect of the invention. System 1000 includes a regional data center (RDC) 1048, and one or more divisions, represented by division head ends 150. RDC 1048 and head ends 150 are interconnected by a network 1046; by way of example and not limitation, a dense wavelength division multiplex (DWDM) network. Elements 1048, 150 on network 1046 may be operated, for example, by or on behalf of a cable MSO, and may be interconnected with a global system of interconnected computer networks that use the standardized Internet Protocol Suite (TCP/IP)(transfer control protocol/Internet protocol), commonly called the Internet 1002; for example, via router 1008. In one or more embodiments, router 1008 is a point-of-presence ("POP") router; for example, of the kind available from Juniper Networks, Inc., Sunnyvale, Calif., USA.

Head ends 150 may each include a head end router (HER) 1091 which interfaces with network 1046. Head end routers 1091 are omitted from FIGS. 2-4 below to avoid clutter.

RDC 1048 may include one or more provisioning servers (PS) 1050, one or more Video Servers (VS) 1052, one or more content servers (CS) 1054, and one or more e-mail servers (ES) 1056. The same may be interconnected to one or more RDC routers (RR) 1060 by one or more multi-layer switches (MLS) 1058. RDC routers 1060 interconnect with network 1046.

A national data center 1098 is provided in some instances; for example, between router 1008 and Internet 1002.

Figure 2:
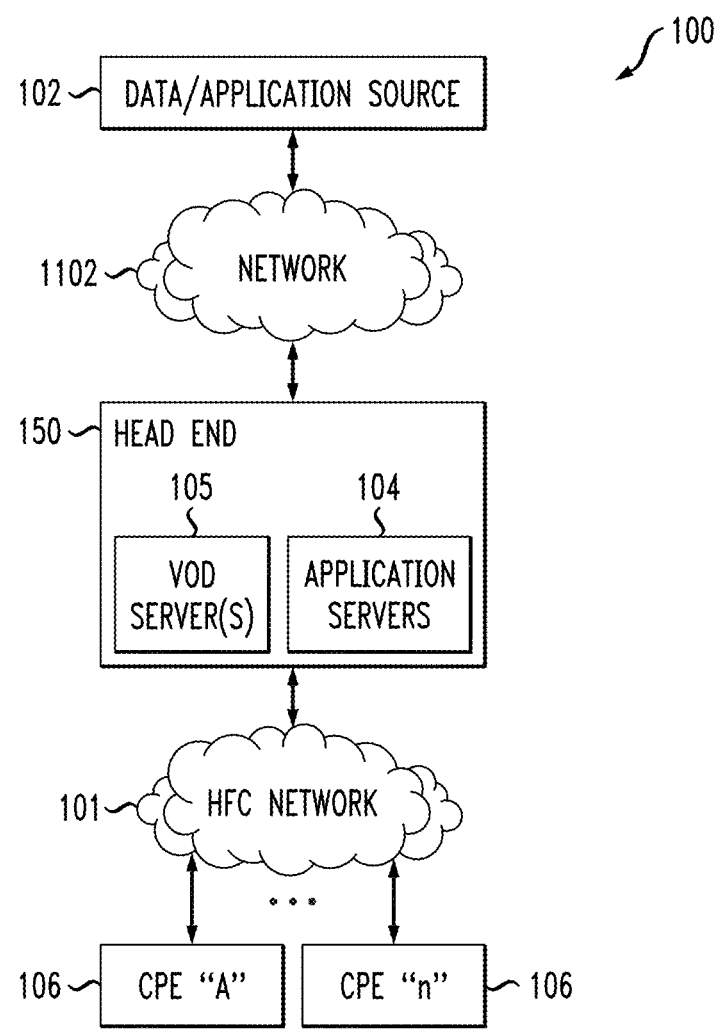
FIG. 2 is a functional block diagram illustrating an exemplary hybrid fiber-coaxial (HFC) divisional network configuration, useful within the system of FIG. 1.

FIG. 2 is a functional block diagram illustrating an exemplary content-based (e.g., hybrid fiber-coaxial (HFC)) divisional network configuration, useful within the system of FIG. 1. See, for example, US Patent Publication 2006/0130107 of Gonder et al., entitled "Method and apparatus for high bandwidth data transmission in content-based networks," the complete disclosure of which is expressly incorporated by reference herein in its entirety for all purposes. The various components of the network 100 include (i) one or more data and application origination points 102; (ii) one or more application distribution servers 104; (iii) one or more video-on-demand (VOD) servers 105, and (v) consumer premises equipment or customer premises equipment (CPE) 106. The distribution server(s) 104, VOD servers 105 and CPE(s) 106 are connected via a bearer (e.g., HFC) network 101. Servers 104, 105 can be located in head end 150. A simple architecture is shown in FIG. 2 for illustrative brevity, although it will be recognized that comparable architectures with multiple origination points, distribution servers, VOD servers, and/or CPE devices (as well as different network topologies) may be utilized consistent with embodiments of the invention. For example, the head-end architecture of FIG. 3 (described in greater detail below) may be used.

The data/application origination point 102 comprises any medium that allows data and/or applications (such as a VOD-based or "Watch TV" application) to be transferred to a distribution server 104, for example, over network 1102. This can include for example a third party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill, given the teachings herein. For example, in one or more embodiments, network 1102 may correspond to network 1046 of FIG. 1, and the data and application origination point may be, for example, within RDC 1048 or on the Internet 1002. Head end 150, HFC network 101, and CPEs 106 thus represent the divisions which were represented by division head ends 150 in FIG. 1.

The application distribution server 104 comprises a computer system where such applications can enter the network system. Distribution servers per se are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other appropriate locations) that can be accessed by a distribution server 104 or a cable modem termination system 156 (discussed below with regard to FIG. 3). Non-limiting examples of CPE are set-top boxes, routers such as premises gateway routers, and high-speed cable modems for providing high bandwidth Internet access in premises such as homes and businesses.

Figure 3:
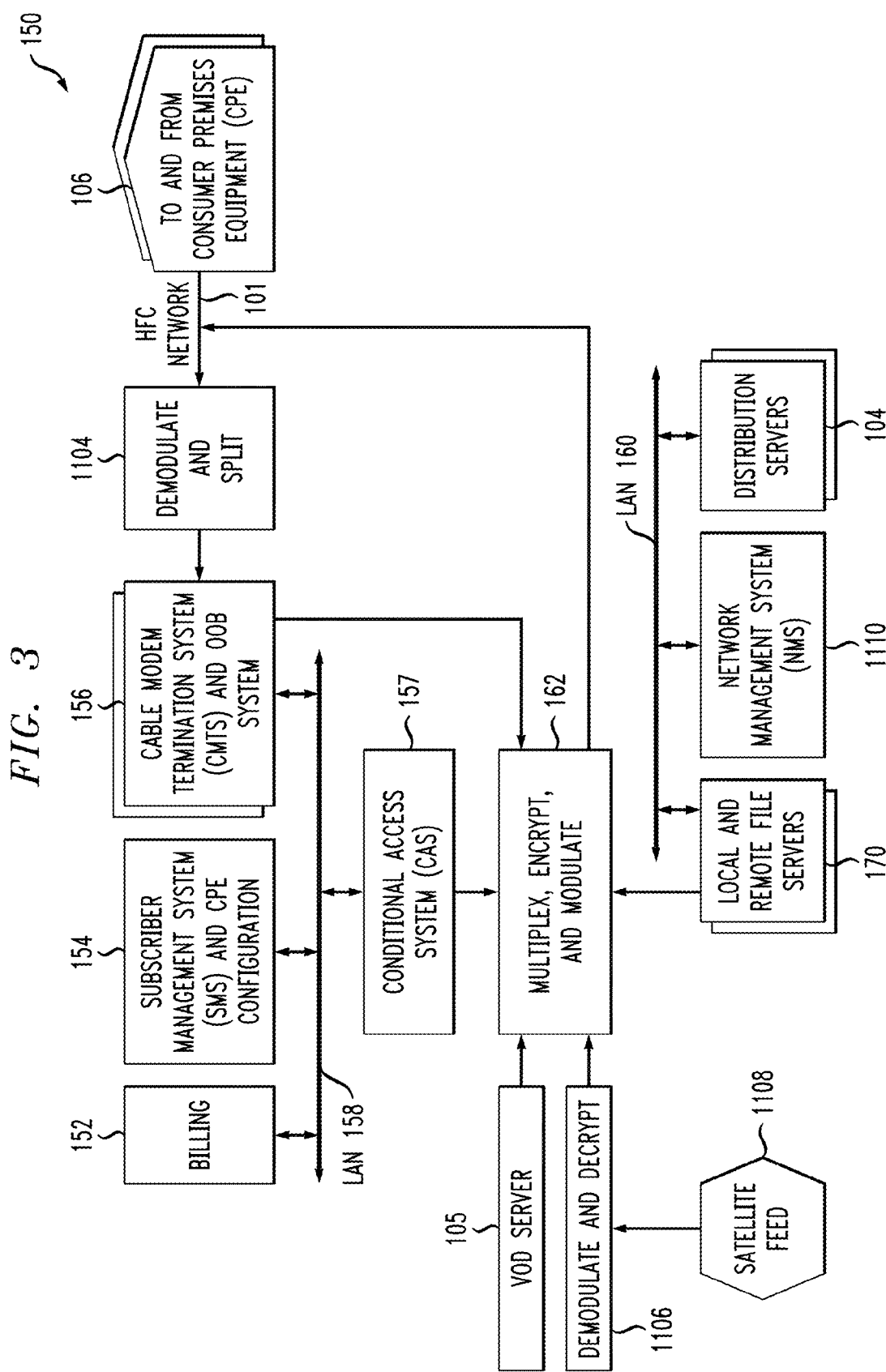
FIG. 3 is a functional block diagram illustrating one exemplary HFC cable network head-end configuration, useful within the system of FIG. 1.

FIG. 3 is a functional block diagram illustrating one exemplary HFC cable network head-end configuration, useful within the system of FIG. 1. As shown in FIG. 3, the head-end architecture 150 comprises typical head-end components and services including billing module 152, subscriber management system (SMS) and CPE configuration management module 154, cable-modem termination system (CMTS) and out-of-band (OOB) system 156, as well as LAN(s) 158, 160 placing the various components in data communication with one another. It will be appreciated that while a bar or bus LAN topology is illustrated, any number of other arrangements (e.g., ring, star, etc.) may be used consistent with the invention. It will also be appreciated that the head-end configuration depicted in FIG. 3 is high-level, conceptual architecture and that each multi-service operator (MSO) may have multiple head-ends deployed using custom architectures.

The architecture 150 of FIG. 3 further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 160 as well, although other architectures may be employed (such as, for example, where the VOD servers are associated with a core switching device such as an 802.3z Gigabit Ethernet device). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (refer to description of FIG. 4) via a variety of interposed network components.

Content (e.g., audio, video, etc.) is provided in each downstream (in-band) channel associated with the relevant service group. To communicate with the head-end or intermediary node (e.g., hub server), the CPE 106 may use the out-of-band (OOB) or DOCSIS channels and associated protocols. The Data Over Cable System Interface Standard (DOCSIS® standard) was released in 1998. DOCSIS® establishes standards for cable modems and supporting equipment. DOCSIS® (Data Over Cable Service Interface Specification) is a registered mark of Cable Television Laboratories, Inc., 400 Centennial Parkway Louisville Colo. 80027, USA, and will be referred to for the remainder of this application in capital letters, without the ® symbol, for convenience. The Open-Cable™ Application Platform (OCAP) 1.0, 2.0, 3.0 (and subsequent) specification (Cable Television laboratories Inc.) provides for exemplary networking protocols both downstream and upstream, although the invention is in no way limited to these approaches. The DOCSIS Set-top Gateway (DSG) Interface Specification, CM-SP-DSG-119-111117, and the OpenCable™ Application Platform Specifications, OpenCable Application Platform (OCAP), OC-SP-OCAP1.2-110512, both available from the aforementioned Cable Television Laboratories, Inc., are expressly incorporated herein by reference in their entireties for all purposes. Furthermore, the DAVIC 1.0 through 1.5 specifications, inclusive, available from DAVIC, the Digital Audio Video Council, are also expressly incorporated herein by reference in their entireties for all purposes. Yet further, the MoCA 1.0, 1.1, and 2.0 specifications, inclusive, available from the Multimedia over Coax Alliance (MoCA), are also expressly incorporated herein by reference in their entireties for all purposes.

It will also be recognized that multiple servers (broadcast, VOD, or otherwise) can be used, and disposed at two or more different locations if desired, such as being part of different server "farms." These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1104 are fed to CMTS and OOB system 156.

Figure 4:
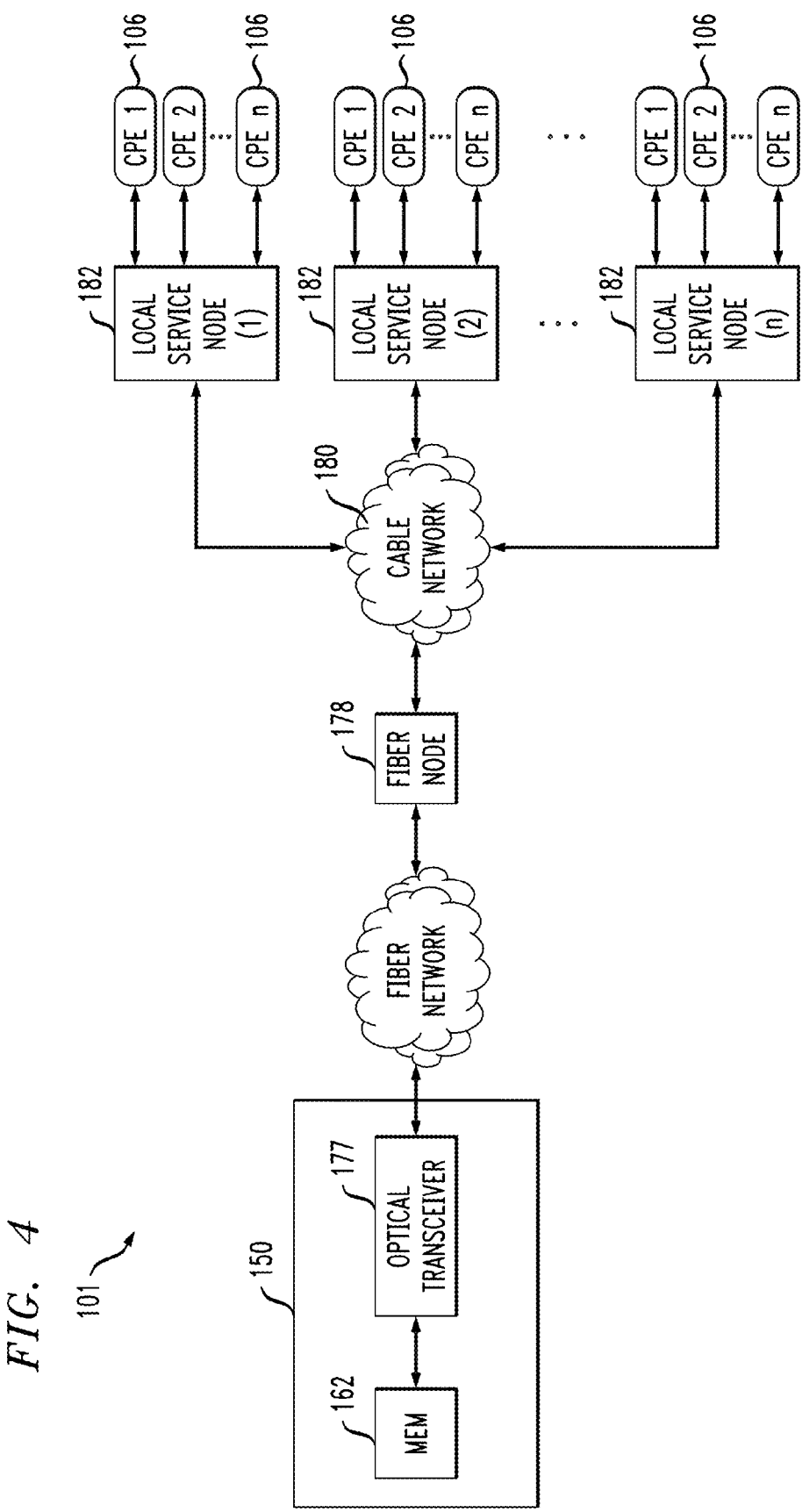
FIG. 4 is a functional block diagram illustrating one exemplary local service node configuration useful within the system of FIG. 1.

As shown in FIG. 4, the network 101 of FIGS. 2 and 3 comprises a fiber/coax arrangement wherein the output of the MEM 162 of FIG. 3 is transferred to the optical domain (such as via an optical transceiver 177 at the head-end 150 or further downstream). The optical domain signals are then distributed over a fiber network to a fiber node 178, which further distributes the signals over a distribution network 180 (typically coax) to a plurality of local servicing nodes 182. This provides an effective 1-to-N expansion of the network at the local service end. Each node 182 services a number of CPEs 106. Further reference may be had to US Patent Publication 2007/0217436 of Markley et al., entitled "Methods and apparatus for centralized content and data delivery," the complete disclosure of which is expressly incorporated herein by reference in its entirety for all purposes. In one or more embodiments, the CPE 106 includes a cable modem, such as a DOCSIS-compliant cable modem (DCCM).

In another aspect, the network 101 may be a switched digital network, as known, for example, from US Patent Publication 2003/0056217 of Paul D. Brooks, entitled "Technique for Effectively Providing Program Material in a Cable Television System," the complete disclosure of which is expressly incorporated herein by reference in its entirety for all purposes. The Brooks publication describes one exemplary broadcast switched digital architecture useful with one or more embodiments of the present invention, although it will be recognized by those of ordinary skill that other approaches and architectures may be substituted.

In addition to "broadcast" content (e.g., video programming), the systems of FIGS. 1-4 also deliver Internet data services using the Internet protocol (IP), although other protocols and transport mechanisms of the type well known in the digital communication art may be substituted. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve. It is important to note that video transmitted via IP typically uses the aforementioned RF channels that are different that the RF channels used for the broadcast video (e.g., via quadrature amplitude modulation (QAM)) and audio.

Figure 5:
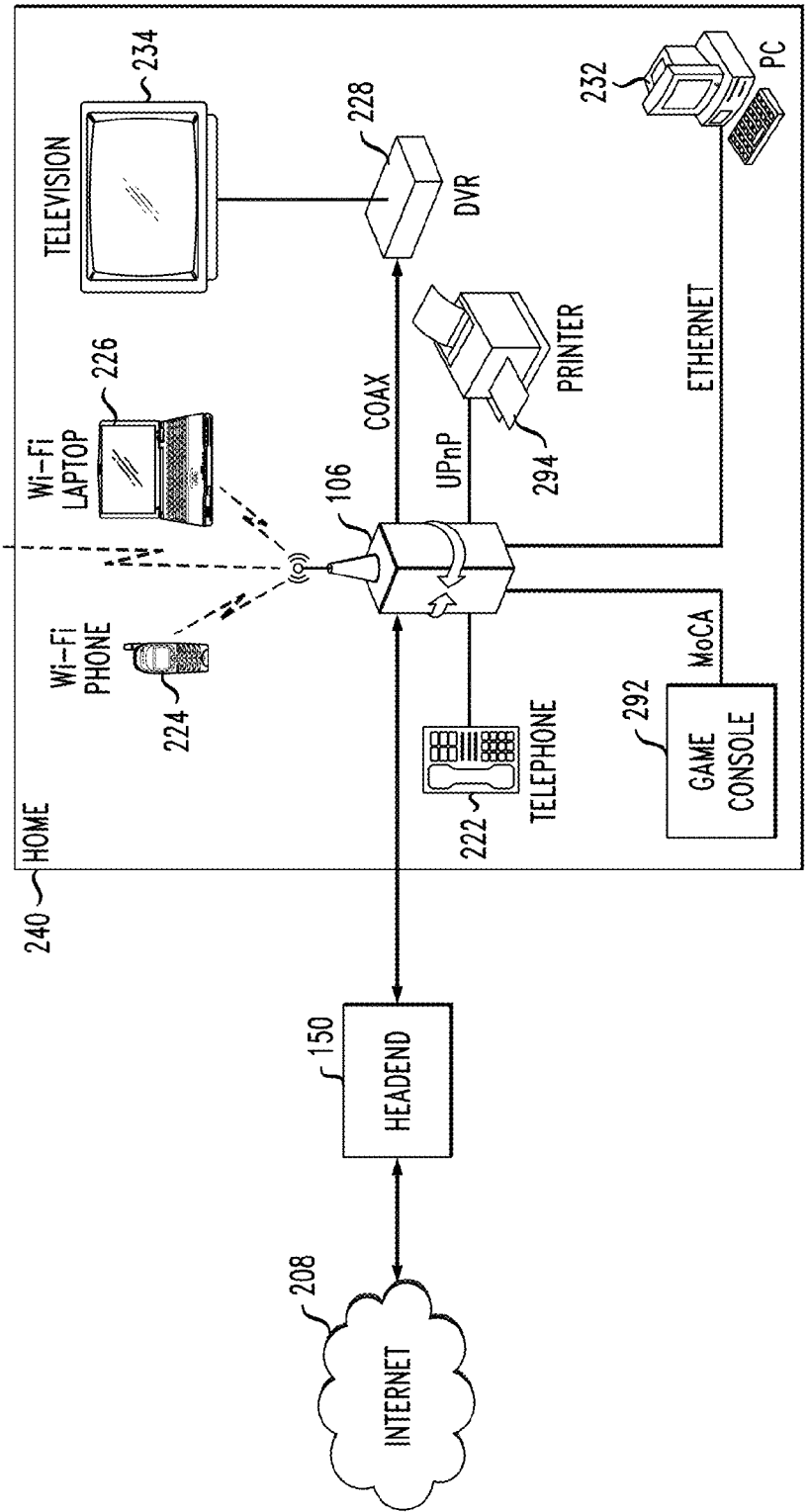
FIG. 5 is a functional block diagram of a content and data distribution network within which one or more aspects of the invention can be implemented.

Reference should now be had to FIG. 5, which presents a block diagram of a premises network interfacing with a head end of an MSO or the like, providing Internet access. An exemplary advanced wireless gateway comprising CPE 106 is depicted as well.

CPE 106 includes an advanced wireless gateway which connects to a head end 150 or other hub of a network, such as a video content network of an MSO or the like. The head end is coupled also to an internet 208 (e.g., the Internet 1002) which is located external to the head end 150, such as via an Internet (IP) backbone or gateway (not shown).

The head end is in the illustrated embodiment coupled to multiple households or other premises, including the exemplary illustrated household 240. In particular, the head end (for example, a cable modem termination system thereof) is coupled via the aforementioned HFC network and local coaxial cable or fiber drop to the premises, including the consumer premises equipment (CPE) 106. The exemplary CPE 106 is in signal communication with any number of different devices including, e.g., a wired telephony unit 222, a Wi-Fi or other wireless-enabled phone 224, a Wi-Fi or other wireless-enabled laptop 226, a session initiation protocol (SIP) phone, an H.323 terminal or gateway, etc. Additionally, the CPE 106 is also coupled to a digital video recorder (DVR) 228 (e.g., over coax), in turn coupled to television 234 via a wired or wireless interface (e.g., cabling, PAN or 802.15 UWB micro-net, etc.). CPE 106 is also in communication with a network (here, an Ethernet network compliant with IEEE Std. 802.3, although any number of other network protocols and topologies could be used) on which is a personal computer (PC) 232.

Other non-limiting exemplary devices that CPE 106 may communicate with include a printer 294; for example over a universal plug and play (UPnP) interface, and/or a game console 292; for example, over a multimedia over coax alliance (MoCA) interface.

CPE 106 is optionally also in signal communication with one or more roaming devices, generally represented by block 290.

A "home LAN" (HLAN) is created in the exemplary embodiment, which may include for example the network formed over the installed coaxial cabling in the premises, the Wi-Fi network, and so forth.

During operation, the CPE 106 exchanges signals with the head end over the interposed coax (and/or other, e.g., fiber) bearer medium. The signals include e.g., Internet traffic, digital programming and other digital signaling or content such as digital (packet-based; e.g., VoIP) telephone (including video telephone) service. The CPE 106 then exchanges this digital information after demodulation and any decryption (and any de-multiplexing) to the particular system(s) to which it is directed or addressed. For example, in one embodiment, a MAC address or IP address can be used as the basis of directing traffic within the client-side environment 240.

Any number of different data flows may occur within the network depicted in FIG. 2. For example, the CPE 106 may exchange digital telephone signals from the head end which are further exchanged with the telephone unit 222, the Wi-Fi phone 224, or one or more roaming devices 290. The digital telephone signals may be IP-based such as Voice-over-IP (VoIP), or may utilize another protocol or transport mechanism. The well known session initiation protocol (SIP) may be used, for example, in the context of a "SIP phone" for making multi-media calls. The network may also interface with a cellular or other wireless system, such as for example a 3G IMS (IP multimedia subsystem) system, in order to provide multimedia calls between a user or consumer in the household domain 240 (e.g., using a SIP phone or H.323 terminal) and a mobile 3G or 4G telephone or personal media device (PMD) user via that user's radio access network (RAN).

The CPE 106 may also exchange Internet traffic (e.g., TCP/IP and other packets) with the head end 150 which is further exchanged with the Wi-Fi laptop 226, the PC 232, one or more roaming devices 290, or other device. CPE 106 may also receive digital programming that is forwarded to the DVR 228 or to the television 234. Programming requests and other control information may be received by the CPE 106 and forwarded to the head end as well for appropriate handling.

Figure 6:
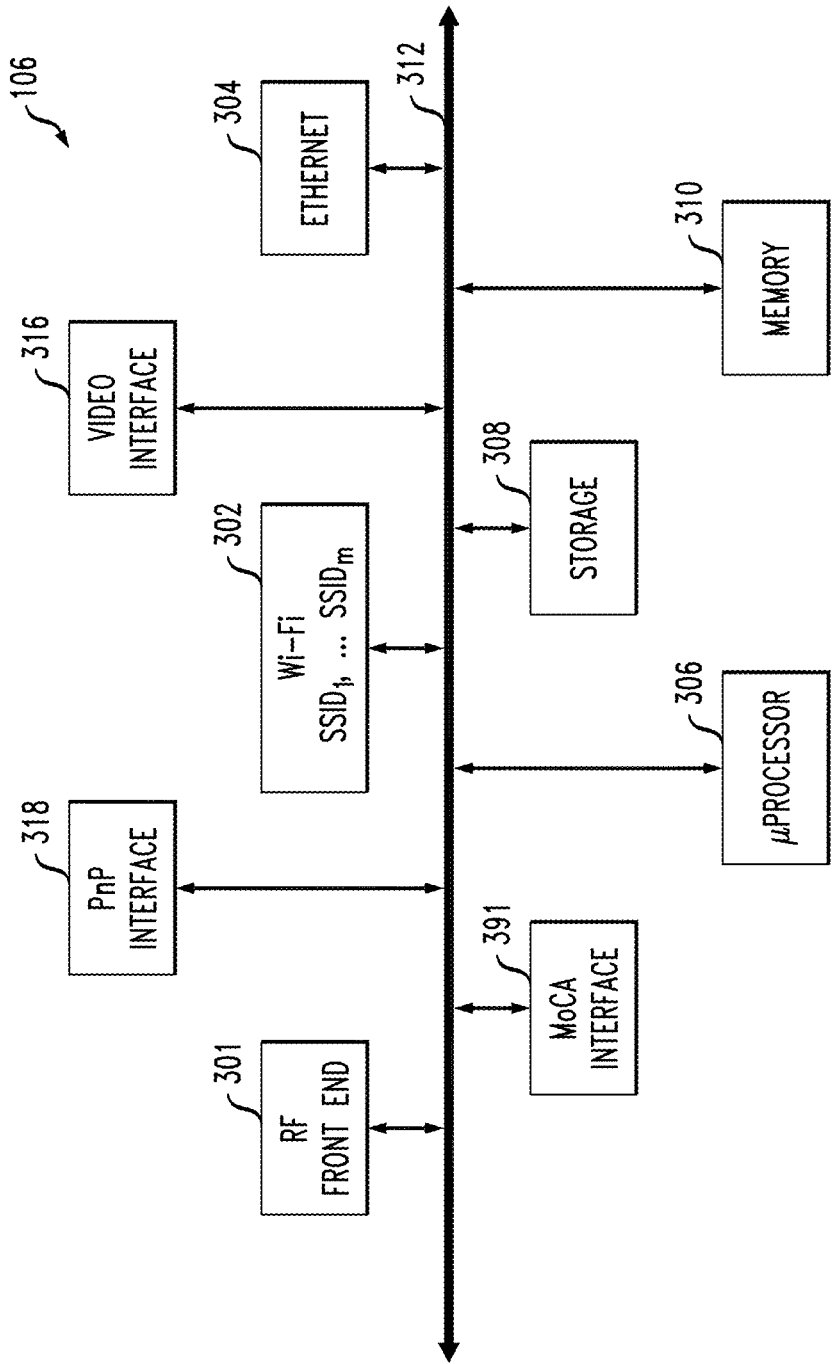
FIG. 6 is a functional block diagram of an exemplary centralized CPE unit of the network of Claim 5.

FIG. 6 is a block diagram of one exemplary embodiment of the CPE 106 of FIG. 5. The exemplary CPE 106 includes an RF front end 301, Wi-Fi interface 302, video interface 316, "Plug n' Play" (PnP) interface 318 (for example, a UPnP interface) and Ethernet interface 304, each directly or indirectly coupled to a bus 312. In one or more embodiments, Wi-Fi interface 302 comprises a single wireless access point (WAP) running multiple ("m") service set identifiers (SSIDs). For the avoidance of doubt, in one or more embodiments, multiple SSIDs, which could represent different applications, are served from a common WAP. For example, SSID 1 is for the home user, while SSID 2 may be for a managed security service, SSID 3 may be a managed home networking service, SSID 4 may be a hot spot, and so on. Each of these is on a separate IP subnetwork for security, accounting, and policy reasons. The microprocessor 306, storage unit 308, plain old telephone service (POTS)/public switched telephone network (PSTN) interface 314, and memory unit 310 are also coupled to the exemplary bus 312, as is a suitable MoCA interface 391. The memory unit 310 typically comprises a random access memory (RAM) and storage unit 308 typically comprises a hard disk drive, an optical drive (e.g., CD-ROM or DVD), NAND flash memory, RAID (redundant array of inexpensive disks) configuration, or some combination thereof.

The illustrated CPE 106 can assume literally any discrete form factor, including those adapted for desktop, floor-standing, or wall-mounted use, or alternatively may be integrated in whole or part (e.g., on a common functional basis) with other devices if desired.

Every embodiment need not necessarily have all the elements shown in FIG. 6. For example, in some embodiments, the network does not provide QAM video to the premises and instead of unit 106 there is a simple cable modem or DSL modem for providing broadband IP data services, via which IP-based video is viewed.

It will be recognized that while a linear or centralized bus architecture is shown as the basis of the exemplary embodiment of FIG. 6, other bus architectures and topologies may be used. For example, a distributed or multi-stage bus architecture may be employed. Similarly, a "fabric" or other mechanism (e.g., crossbar switch, RAPIDIO interface, non-blocking matrix, TDMA or multiplexed system, etc.) may be used as the basis of at least some of the internal bus communications within the device. Furthermore, many if not all of the foregoing functions may be integrated into one or more integrated circuit (IC) devices in the form of an ASIC or "system-on-a-chip" (SoC). Myriad other architectures well known to those in the data processing and computer arts may accordingly be employed.

It will also be recognized that the CPE configuration shown is essentially for illustrative purposes, and various other configurations of the CPE 106 are consistent with other embodiments of the invention. For example, the CPE 106 in FIG. 6 may not include all of the elements shown, and/or may include additional elements and interfaces such as for example an interface for the HomePlug A/V standard which transmits digital data over power lines, a PAN (e.g., 802.15), Bluetooth, or other short-range wireless interface for localized data communication, etc. Again, every embodiment need not necessarily have all the elements shown in FIG. 6.

A suitable number of standard 10/100/1000 Base T Ethernet ports for the purpose of a Home LAN connection are provided in the exemplary device of FIG. 6; however, it will be appreciated that other rates (e.g., Gigabit Ethernet or 10-Gig-E) and local networking protocols (e.g., MoCA, USB, etc.) may be used. These interfaces may be serviced via a WLAN interface, wired RJ-45 ports, or otherwise. The CPE 106 can also include a plurality of RJ-11 ports for telephony interface, as well as a plurality of USB (e.g., USB 2.0) ports, and IEEE-1394 (Firewire) ports. S-video and other signal interfaces may also be provided if desired.

During operation of the CPE 106, software located in the storage unit 308 is run on the microprocessor 306 using the memory unit 310 (e.g., a program memory within or external to the microprocessor). The software can control the operation of other components, and provides various other functions within the CPE. Other system software/firmware may also be externally reprogrammed, such as using a download and reprogramming of the contents of the flash memory, replacement of files on the storage device or within other non-volatile storage, etc. This allows for remote reprogramming or reconfiguration of the CPE 106 by the MSO or other network agent.

The RF front end 301 of the exemplary embodiment comprises a cable modem of the type known in the art. In this fashion, content or data normally streamed over the cable modem can be received and distributed by the CPE 106, such as for example packetized video (e.g., IPTV). The digital data exchanged using RF front end 301 includes IP or other packetized protocol traffic that provides access to internet service. As is well known in cable modem technology, such data may be streamed over one or more dedicated QAMs resident on the HFC bearer medium, or even multiplexed or otherwise combined with QAMs allocated for content delivery, etc. The packetized (e.g., IP) traffic received by the CPE 106 may then be exchanged with other digital systems in the local environment 240 (or outside this environment by way of a gateway or portal) via, e.g. the Wi-Fi interface 302, Ethernet interface 304 or plug-and-play (PnP) interface 318.

It will be appreciated, however, that the RF front end 301 of the CPE may comprise (either in addition to or in place of the cable modem) a traditional video RF front end 301 (e.g., tuner) adapted to receive video signals over, e.g., a QAM. For example, one exemplary embodiment of the RF front end 301 comprises one or more tuners, a demodulator, decryption module, and demultiplexer of the type well known in the art, although other configurations may be used. Additionally, the RF front end 301 modulates, encrypts/multiplexes as required, and transmits digital information for receipt by upstream entities such as the CMTS or a network server. Digital data transmitted via the RF front end 301 may include, for example, MPEG-2 encoded programming data that is forwarded to a television monitor via the video interface 316. Programming data may also be stored on the CPE storage unit 308 for later distribution by way of the video interface 316, or using the Wi-Fi interface 302, Ethernet interface 304, Firewire (IEEE Std 1394), USB/USB2, or any number of other such options.

Other devices such as portable music players (e.g., MP3 audio players) may be coupled to the CPE 106 via any number of different interfaces, and music and other media files downloaded for portable use and viewing.

In some instances, the CPE 106 includes a DOCSIS cable modem for delivery of traditional broadband Internet services. This connection can be shared by all Internet devices in the premises 240; e.g. Internet protocol television (IPTV) devices, PCs, laptops, etc., as well as by roaming devices 290. In addition, the CPE 106 can be remotely managed (such as from the head end 150, or another remote network agent) to support appropriate IP services.

In some instances the CPE 106 also creates a home Local Area Network (LAN) utilizing the existing coaxial cable in the home. For example, an Ethernet-over-coax based technology allows services to be delivered to other devices in the home utilizing a frequency outside (e.g., above) the traditional cable service delivery frequencies. For example, frequencies on the order of 1150 MHz could be used to deliver data and applications to other devices in the home such as PCs, PMDs, media extenders and set-top boxes. The coaxial network is merely the bearer; devices on the network utilize Ethernet or other comparable networking protocols over this bearer.

The exemplary CPE 106 shown in FIGS. 5 and 6 acts as a Wi-Fi access point (AP), thereby allowing Wi-Fi enabled devices to connect to the home network and access Internet, media, and other resources on the network.

In one embodiment, Wi-Fi interface 302 comprises a single wireless access point (WAP) running multiple ("m") service set identifiers (SSIDs). One or more SSIDs can be set aside for the home network while one or more SSIDs can be set aside for roaming devices 290.

A premises gateway software management package (application) is also provided to control, configure, monitor and provision the CPE 106 from the cable head-end 150 or other remote network node via the cable modem (DOCSIS) interface. This control allows a remote user to configure and monitor the CPE 106 and home network.

The MoCA interface 391 can include, for example, a MoCA, retail compliant F-connector for providing data over coax capability. The exemplary MoCA port operates in the 1125-1525 MHz band, although other frequencies (MoCA compliant or otherwise) may be used for this purpose if desired. The MoCA frequencies can be multiplexed onto the cable input port of the CPE 106, or sent over another channel (e.g., dedicated channel or interface). The CPE 106 also optionally includes a switched packet interface between the Ethernet port and the MoCA interface. In one embodiment, data traffic flows through the CPE 106 between the Ethernet or other network interface and MoCA ports. In some cases, this occurs without requiring host processor intervention; in other instances, host processor intervention is a possibility. The CPE 106 may include switched or routed processing between, e.g., Ethernet and/or MoCA and/or Wi-Fi, without limitation. In other words, it is possible for two (or more) Ethernet ports to be switched, meaning the gateway only looks at the layer two address to forward out the correct interface, or bridged, meaning the gateway forwards all packets from all Ethernet ports out all Ethernet ports, or routers, meaning the gateway examines the destination IP address to determine which port to forward.

As discussed above, the exemplary Wi-Fi wireless interface 302 is optionally also configured to provide a plurality of unique service set identifiers (SSIDs) simultaneously. These SSIDs are configurable (locally or remotely), such as via a web page.

Figure 7:
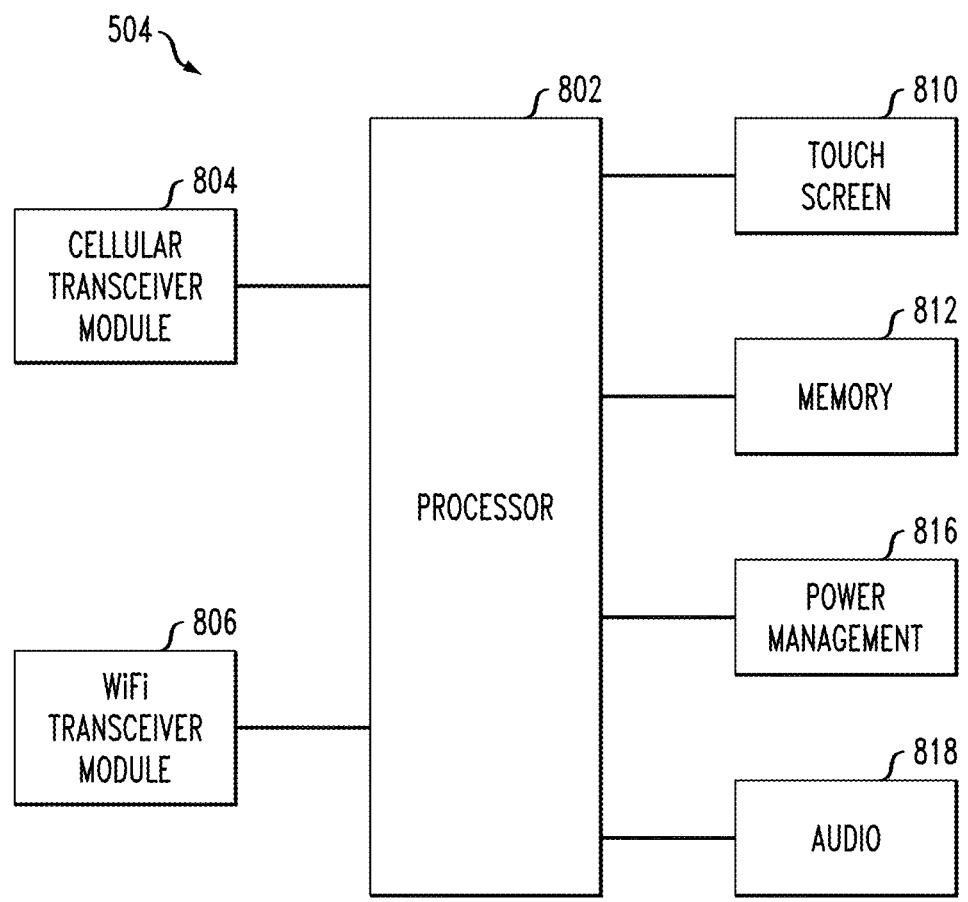
FIG. 7 is an exemplary block diagram of a tablet device forming a portion of the system of FIG. 8.

FIG. 7 is a block diagram of an exemplary tablet computing device or smart phone or the like (e.g., devices 1891, 1893 described below). Phone or tablet computing device 504 includes a suitable processor; e.g., a microprocessor 802. A cellular transceiver module 804 (may be omitted in some tablet devices) coupled to processor 802 includes an antenna and appropriate circuitry to send and receive cellular telephone signals, e.g., 3G or 4G. A WiFi transceiver module 806 coupled to processor 802 includes an antenna and appropriate circuitry to allow tablet computing device 504 to connect to the Internet via a wireless network access point or hotspot. The skilled artisan will appreciate that "Wi-Fi" is a trademark of the Wi-Fi Alliance and the brand name for products using the IEEE 802.11 family of standards.

In one or more embodiments, one or more applications in memory 812, when loaded into RAM cause the processor 802 to implement aspects of the functionality described herein.

Touch screen 810 coupled to processor 802 is also generally indicative of a variety of devices such as a keypad, another type of display, a mouse or other pointing device, and so on, all of which may or may not be present in one or more embodiments. Memory 812 is coupled to processor 102; see also discussion of FIG. 10 below. Audio module 818 coupled to processor 802 includes, for example, an audio coder/decoder (codec), speaker, headphone jack, microphone, and so on. Power management system 816 can include a battery charger, an interface to a battery, and so on.

One non-limiting exemplary form of tablet computing device is the iPad® tablet computing device (registered mark of Apple Inc., Cupertino, Calif., USA). However, embodiments of the invention are not limited to this particular form of tablet device, or indeed to tablet devices in general—other exemplary devices include so-called smart phones, other types of portable electronic device having a display with a touch screen, and the like. Furthermore, while in one or more embodiments, a gesture-based approach involving a touch screen is employed, other embodiments are not limited to touch screen devices, but are broadly applicable to gesture-based interfaces. Non-limiting examples of same include click and drag interfaces with a mouse, trackball, or the like to click and drag on icons on a laptop computer or other computing device.

Figure 8:
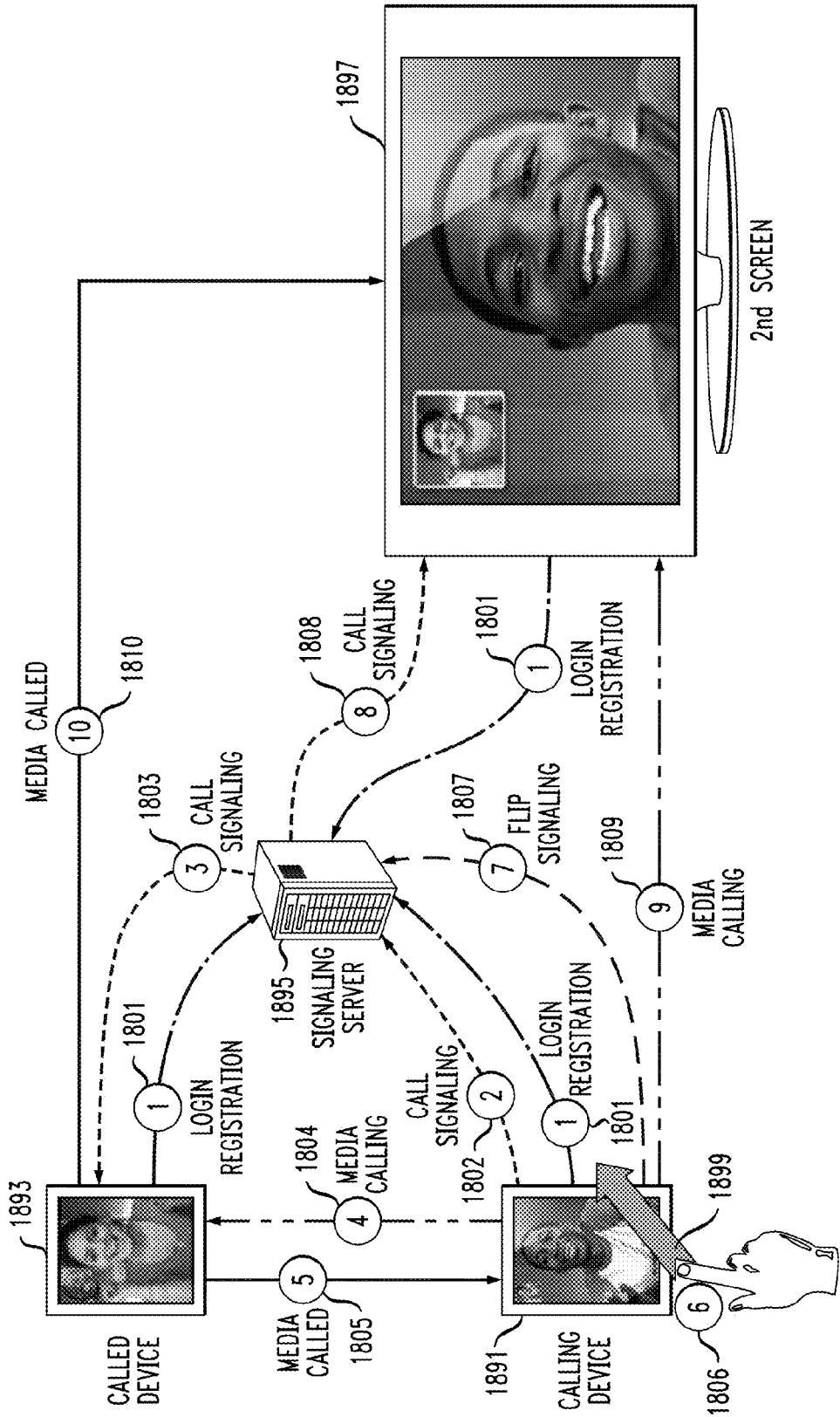
FIG. 8 shows an exemplary system with exemplary messaging flow, according to an aspect of the invention.

One or more embodiments provide "Video Chat Flip" functionality. One or more embodiments provide a method, system, and/or computer program product to allow a user participating in a mobile device video chat to "flip" the display to a second screen. In one or more embodiments, the mobile device is still used as an input device after the video is "flipped." Referring now to FIG. 8, in a first step 1801, all devices log in, in a register, to make and/or receive calls. The devices include calling device 1891, called device 1893, and second screen 1897. The register may reside, for example, directly on signaling server 1895 or in connection with signaling server 1895 (e.g., on a separate registration server coupled to the signaling server 1895).

The devices 1891, 1893, and 1897 are in IP data communication with server 1895. For example, big screen 1897 may have connectivity (e.g., via an HDMI (High-Definition Multimedia Interface) connection to a set-top box, a Wi-Fi connection to an access point, or even via a USB connection if the screen has a USB port) to a gateway device 106 coupled to an HFC network or other network providing Internet connectivity. Devices 1891, 1893 may have, e.g., 3G or 4G wireless cellular connectivity to the Internet via a wireless Internet service provider (ISP); or wireless LAN connectivity to gateway device 106 coupled to an HFC network or the like. Server 1895 has Internet connectivity and may be located, for example, in a data center such as regional data center 1048 or a national data center 1098.

In a second step 1802, the calling device 1891 initiates the call. In a third step 1803, the called device 1893 receives the incoming call request and responds to same to complete the call setup. In a fourth step 1804, the calling device 1891 sends media intended for device 1893. In a fifth step 1805, the called device 1893 sends media intended for device 1891. In a sixth step 1806, the calling user initiates the "flip" of the video from the device 1891 to the second screen 1897. This can be, for example, via a gesture 1899 in the direction of the second screen 1897 (e.g., towards the top of the touch screen (e.g., 810) of device 1891). In a seventh step 1807, the calling device 1891 sends a "flip" signal to the signaling server 1895. In an eighth step 1808, the second screen 1897 receives the incoming call request and responds to complete call setup. In a ninth step 1809, the calling device 1891 sends duplicate media to the second screen 1897. In a tenth step 1810, the called device 1893 sends media to the second screen 1897.

It is to be emphasized that the steps could be carried out in a different order in other embodiments.

Thus, in one or more embodiments, during video chat on a mobile device, the video is flipped over to a larger screen 1897 while nevertheless using the mobile device 1891 for input (video camera and microphone). A signaling server 1895 is used to set calls. At least some embodiments are implemented by modifying existing infrastructure using SIP (the session initiation protocol). All devices preferably run software that can understand and participate in that signaling.

To review, in step 1801, each device 1891, 1893, 1897 logs in and registers with the signaling server 1895 to indicate that it is capable of participating in video calls. In step 1802, the calling device 1891 signals signaling server 1895 that it wants to initiate a call to the called device 1893. Tablets 1891, 1893 are shown but any computing platform with a camera and microphone that is capable of carrying out video conferencing can be employed ("smart" mobile phone or other mobile device, laptop PC, desktop PC, etc.).

In step 1803, signaling server 1895 sends an inbound request to the called device 1893 to advise it that it has an inbound call, and the called device 1893 acknowledges that ("ACK"). The call "ACK" is sent back to the calling device 1891, so that a call is established and the appropriate information is exchanged. The ACK is omitted from the drawing to avoid clutter. The "ACK" can be routed back through the signaling server 1895, for example.

Steps 1804 and 1805 involve exchange of the media (audio and video) between the two devices 1891, 1893. So, at this point, there is a video chat between the two devices 1891, 1893.

Steps 1801-1805 can be implemented using a conventional call setup for IP telephony (e.g., using Session Initiation Protocol (SIP)) or using techniques such as in the SKYPE service. REGISTER, INVITE, and ACK are standard SIP requests that can be used in one or more embodiments. Big screen 1897 registers using the REGISTER request; for example, via a software component on the big screen 1897 or a related device such as a set-top box or the like. This software component can be similar to a component found on a SIP phone or the like; the component will initiate the registration process using the REGISTER request or the like. In step 1806, the user on his or her device 1891 signals (e.g., via swiping the touch screen, as at 1899, but this but one non-limiting example) that he or she wants to move the video display to a second screen 1897 in the home. In step 1807, this sends another signal to the signaling server 1895 to flip to the large screen 1897. For example, a suitable application may be downloaded to the smart phone 1891 or the like, which application detects the gesture and then initiates the signal to signaling server 1895 to flip over to the large screen.

In step 1808, signaling server 1895 signals the second screen 1897 that it will receive an inbound call. In steps 1809 and 1810, media from called device 1893 and calling device 1891 are now sent to the big screen 1897. The user can hold and use the device (e.g. tablet) as a camera and microphone, but the second screen 1897 provides the audio and video output in a bigger format. Thus, the user may start the video call on his tablet 1891, sit on his couch, and move it to the big-screen TV 1897 using a tablet or smart phone as an input device. In some cases, the audio and video output are disabled on device 1891. In some other cases, the video may appear on both the tablet and the large screen 1897. The same is also true of the audio in some cases, although having audio on both device 1891 and screen 1897 simultaneously may be less desirable.

In one or more embodiments, the "flipping" aspect is implemented via a re-invite using normal SIP mechanisms and triggered by the software (SW) in the client (calling device) 1891. In some instances, as noted, the calling device 1891 may shut off the video display and audio output on device 1891 and leave the camera and microphone on, and then the media is cloned in steps 1809 and 1810 to the big screen 1897.

In some instances, a software component on the signaling server 1895 intercepts messages and re-routes them to big screen 1897 and/or sets up a 3-way call. That is to say, in some cases, the session on device 1891 is not torn down, but continues and there is in effect a three-way call now including the big screen 1897 as well as devices 1891, 1893. On the other hand, in some cases, the session on device 1891 is torn down, and the call continues using big screen 1897 and device 1893.

As noted, one or more embodiments utilize SIP. The devices 1891, 1893, and 1897 may include, for example, SIP user agents which can perform both the role of SIP user agent clients (UAC) and SIP user agent servers (UAS). When the devices send requests, they function as UACs. When the devices receive requests and respond, they function as UASs. The signaling server 1895 may include, for example, one or more of SIP proxy server functionality, SIP registrar functionality (accepting REGISTER requests), SIP redirect server functionality, and SIP session border controller functionality.

Step 1801 can be carried out, for example, by having a SIP UAC on each device 1891, 1893, 1897 send a SIP REGISTER message to server 1895. Step 1802 can be carried out, for example, by calling device 1891 sending a SIP INVITE message to server 1895 which is forwarded from signaling server 1895 to the called device 1893 in step 1803. The called device 1893 acknowledges same with a SIP ACK message (not shown). The call ACK is sent back to the calling device 1891 via server 1895, so that a call is established and the appropriate information is exchanged. Steps 1804 and 1805 may be carried out, for example, via SIP transactions.

As noted above, in some cases, the session on device 1891 is not torn down, but continues and there is in effect a three-way call now including the big screen 1897 as well as devices 1891, 1893. On the other hand, in some cases, the session on device 1891 is torn down, and the call continues using big screen 1897 and device 1893. In this latter case, a REFER command may be sent from device 1891 to transfer the call over to the big screen 1897. The signaling server receives this command and in step 1808 invites the big screen 1897; the session with device 1891 is subsequently torn down. In an alternative approach, an API can be provided on signaling sever 1895, which the device 1891 can send a proprietary message to. On the other hand, in the former case (maintain the session with device 1891), device 1891 sends an indication to the signaling server to ask screen 1897 to be included into the conversation; in essence, an INVITE to big screen 1897 to join the conversation. In this case, device 1891 carries out a mixing function to ensure that device 1893 receives what screen 1897 sends and that screen 1897 receives what device 1893 sends. This mixing function can be implemented, for example, with the aforementioned software application downloaded to the device 1891.

As noted, in step 1808, signaling server 1895 may signal the second screen 1897 that it will receive an inbound call using, for example, a SIP INVITE command.

Media from called device 1893 and calling device 1891 is preferably routed directly to the big screen 1897 in steps 1809 and 1810; however, in an optional approach, it can be re-routed via the signaling server 1895.

Given the discussion thus far, it will be appreciated that, in general terms, an exemplary method, according to an aspect of the invention, includes the step 1807 of receiving, at a signaling server 1895, during a video chat between a first device 1891 and a second device 1893, a flip signal from the first device. The flip signal indicates that media packets from the second device intended for the first device are to be sent to a third device 1897. As used herein, "media packets" include video and/or audio packets. This step can be carried out, for example, using a message router module 1870, shown in FIG. 9 and discussed further below. In response to the signaling server 1895 receiving the flip signal, the signaling server sends a call request to the third device, as seen at 1808. This step can be carried out, for example, using the message router module 1870 and a session manager module 1871, also shown in FIG. 9 and discussed further below. Also in response to the signaling server 1895 receiving the flip signal, the signaling server sends a message to the second device to cause the second device to send the media packets to the third device. This step can also be carried out, for example, using the message router module 1870 and session manager module 1871.

In some cases, the signaling server sends a message to the second device to cause the second device to refrain from sending the media packets to the first device when sending the media packets to the third device; the session with device 1891 is torn down. This step can also be carried out, for example, using the message router module 1870 and session manager module 1871. In other instances, the signaling server does not send any such message, and in effect, a three-way call ensues.

In some instances a further step includes making available for download to the first device, the aforementioned application. The application is configured to detect, at the first device 1891, during the video chat, a gesture which indicates that the media packets from the second device intended for the first device are to be sent to the third device (step 1806). Responsive to such detecting, the aforementioned flip signal is sent.

In another aspect, an exemplary signaling server 1895 includes a memory 2130; and at least one processor 2120, coupled to the memory, and operative carry out or otherwise facilitate any one, some, or all of the method steps just described. Note that the step of making the application available for download could be carried out by another server such as one of the application servers 104 or a server of a third party (e.g., a so-called "app store").

In some instances, the server 1895 further includes a plurality of distinct software modules, embodied in a non-transitory manner on a computer-readable storage medium; for example, message router module 1870, session manager module 1871, and optionally business logic module 1872.

In another aspect, another exemplary method includes detecting, at a first portable computing device 1891, during a video chat between the first portable computing device and a second device 1893, a gesture 1899; see step 1806, which indicates that media packets from the second device intended for the first device are to be sent to a third device 1897. Responsive to the detecting, in step 1807, a flip signal is sent from the first portable computing device to a signaling server 1895. The flip signal indicates that the media packets from the second device intended for the first device are to be sent to the third device.

In some instances, a further step includes carrying out a mixing function on the first portable computing device to ensure that the second device receives media packets sent from the third device and that the third device receives media packets sent from said second device.

These aspects associated with first device 1891 may be carried out or otherwise facilitated by the aforementioned downloaded application, for example.

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). Appropriate interconnections via bus, network, and the like can also be included.

Figure 10:
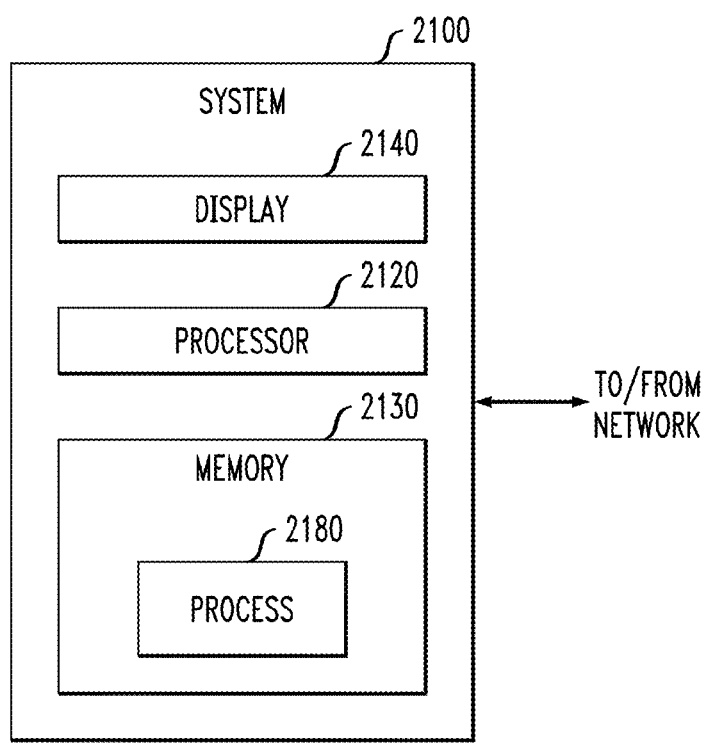
FIG. 10 is a block diagram of a computer system useful in connection with one or more aspects of the invention.

FIG. 10 is a block diagram of a system 2100 that can implement at least some aspects of the invention, and is representative, for example, of the servers shown in the figures. The processor, memory, and process are also representative of aspects of the functionality of smart phones, tablet devices, and the like. As shown in FIG. 10, memory 2130 configures the processor 2120 to implement one or more methods, steps, and functions (collectively, shown as process 2180 in FIG. 10) described herein. The memory 2130 could be distributed or local and the processor 2120 could be distributed or singular. Different steps could be carried out by different processors.

The memory 2130 could be implemented as an electrical, magnetic or optical memory, or any combination of these or other types of storage devices; it is also representative of memory 812. It should be noted that if distributed processors are employed, each distributed processor that makes up processor 2120 generally contains its own addressable memory space. It should also be noted that some or all of computer system 2100 can be incorporated into an application-specific or general-use integrated circuit. For example, one or more method steps could be implemented in hardware in an ASIC rather than using firmware. Display 2140 is representative of a variety of possible input/output devices (e.g., keyboards, mice, and the like). Every processor may not have a display, keyboard, mouse or the like associated with it.

The notation "TO/FROM NETWORK" is representative of a variety of wired and/or wireless network interfaces (e.g., Ethernet port on the motherboard, network cards, or the like).

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system (including, for example, system 2100 or processing capability on a tablet, smart phone, signaling server, second screen device, or the like), to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is further defined to not include a transmission medium or disembodied signal.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program comprising computer program code means adapted to perform one or all of the steps of any methods or claims set forth herein when such program is run, for example, on the device of FIG. 7, a laptop computer, a server such as server 1895, or the like, and that such program may be embodied on a tangible computer readable recordable storage medium. As used herein, including the claims, a "server" includes a physical data processing system (for example, system 2100 as shown in FIG. 10) running a server program. It will be understood that such a physical server may or may not include a display, keyboard, or other input/output components. Furthermore, as used herein, including the claims, a "router" includes a networking device with both software and hardware tailored to the tasks of routing and forwarding information.

Figure 9:
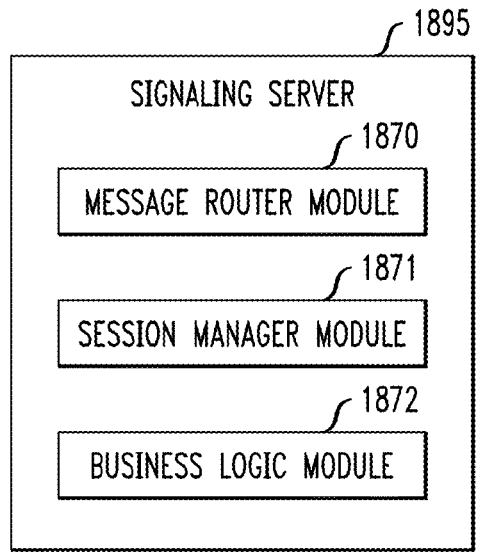
FIG. 9 is an exemplary software architecture diagram, according to an aspect of the invention.

Furthermore, it should be noted that any of the methods described herein can include an additional step of providing a system comprising distinct software modules and/or submodules embodied on one or more tangible computer readable storage media. All the modules (or any subset thereof) can be on the same medium, or each can be on a different medium, for example. The modules can include any or all of the components shown in the figures that might be implemented in software executing on a processor. As seen in FIG. 9, in some instances, the modules reside on the signaling server 1895 and include:

message router module 1870—processes and parses SIP (or similar) messages and determines their meaning and where they are intended to go to session manager module 1871—sets up and tears down sessions, and instructs remaining device to re-direct to new device in cases where session with transferring device is to be torn down (e.g., when device 1891 transfers call to screen 1897 and drops off)

optionally, a business logic module 1872—determines whether requested flip is permitted The method steps can then be carried out using the distinct software modules of the system, as described above, executing on one or more hardware processors (e.g., a processor or processors in a signaling server 1895, processor 306, processor 802, processor 2120, and the like). Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:
   receiving, at a signaling server, during a video chat between a first device and a second device, a flip signal from said first device, said flip signal indicating that media packets from said second device intended for said first device are to be sent to a third device; and
   responsive to said signaling server receiving said flip signal:
      said signaling server sending a call request to said third device; and
      said signaling server sending a message to said second device to cause said second device to send said media packets to said third device.

2. The method of claim 1, further comprising said signaling server sending a message to said second device to cause said second device to refrain from sending said media packets to said first device when sending said media packets to said third device.

3. The method of claim 1, further comprising providing a system, wherein the system comprises distinct software modules, each of the distinct software modules being embodied on a computer-readable storage medium, and wherein the distinct software modules comprise a message router module and a session manager module;
   wherein:
      said receiving of said flip signal is carried out by said message router module executing on at least one hardware processor;
      said sending of said call request to said third device is carried out by said message router module and said session manager module executing on said at least one hardware processor; and
      said sending a message to said second device to cause said second device to send said media packets to said third device is carried out by said message router module and said session manager module executing on said at least one hardware processor.

4. The method of claim 1, further comprising making available for download to said first device, an application configured to:
   detect, at said first device, during said video chat between said first device and said second device, a gesture which indicates that said media packets from said second device intended for said first device are to be sent to said third device; and
   responsive to said detecting, send said flip signal.

5. An article of manufacture comprising a computer program product, said computer program product comprising:
   a tangible computer-readable recordable storage medium, storing in a non-transitory manner computer readable program code, the computer readable program code comprising:
      computer readable program code configured to receive, at a signaling server, during a video chat between a first device and a second device, a flip signal from said first device, said flip signal indicating that media packets from said second device intended for said first device are to be sent to a third device; and
      computer readable program code configured to, responsive to said signaling server receiving said flip signal:
         cause said signaling server to send a call request to said third device; and
         cause said signaling server to send a message to said second device to cause said second device to send said media packets to said third device.

6. The article of manufacture of claim 5, further comprising said signaling server sending a message to said second device to cause said second device to refrain from sending said media packets to said first device when sending said media packets to said third device.

7. The article of manufacture of claim 5, further comprising said signaling server not sending a message to said second device to cause said second device to refrain from sending said media packets to said first device when sending said media packets to said third device.

8. The article of manufacture of claim 5, wherein:
   said computer-readable program code comprises distinct software modules;
   said distinct software modules comprise a message router module and a session manager module;
   said message router module comprises said computer readable program code configured to receive said flip signal; and
   said message router module and said session manager module cooperatively comprise:
      said computer readable program code configured to cause said signaling server to send said call request to said third device; and
      said computer readable program code configured to cause said signaling server to send said message to said second device to cause said second device to send said media packets to said third device.

9. A signaling server comprising:
   a memory; and
   at least one processor, coupled to said memory, and operative to:
      receive, at said signaling server, during a video chat between a first device and a second device, a flip signal from said first device, said flip signal indicating that media packets from said second device intended for said first device are to be sent to a third device; and
      responsive to said signaling server receiving said flip signal:
         send a call request from said signaling server to said third device; and
         send a message from said signaling server to said second device to cause said second device to send said media packets to said third device.

10. The signaling server of claim 9, wherein said at least one processor is further operative to cause said signaling server to send a message to said second device to cause said second device to refrain from sending said media packets to said first device when sending said media packets to said third device.

11. The signaling server of claim 9, wherein said at least one processor is further operative to cause said signaling server to not send a message to said second device to cause said second device to refrain from sending said media packets to said first device when sending said media packets to said third device.

12. The signaling server of claim 9, further comprising a plurality of distinct software modules, each of the distinct software modules being embodied on a computer-readable storage medium, and wherein the distinct software modules comprise a message router module and a session manager module;
wherein:
said at least one processor is operative to receive said flip signal by executing said message router module;
said at least one processor is operative to send said call request to said third device by executing said message router module and said session manager module; and
said at least one processor is operative to send said message to said second device to cause said second device to send said media packets to said third device by executing said message router module and said session manager module.

13. An apparatus comprising:
means for receiving, at a signaling server, during a video chat between a first device and a second device, a flip signal from said first device, said flip signal indicating that media packets from said second device intended for said first device are to be sent to a third device; and
means, responsive to said signaling server receiving said flip signal, for:
causing said signaling server to send a call request to said third device; and
causing said signaling server to send a message to said second device to cause said second device to send said media packets to said third device.

14. The apparatus of claim 13, further comprising means for causing said signaling server to send a message to said second device to cause said second device to refrain from sending said media packets to said first device when sending said media packets to said third device.

15. The apparatus of claim 13, further comprising means for causing said signaling server not to send a message to said second device to cause said second device to refrain from sending said media packets to said first device when sending said media packets to said third device.

16. A method comprising the steps of:
detecting, at a first portable computing device, during a video chat between said first portable computing device and a second device, a gesture which indicates that media packets from said second device intended for said first device are to be sent to a third device;
responsive to said detecting, sending a flip signal from said first portable computing device to a signaling server, said flip signal indicating that said media packets from said second device intended for said first device are to be sent to said third device; and
responsive to said signaling server receiving said flip signal, said signaling server sending a call request to said third device.

17. The method of claim 16, further comprising carrying out a mixing function on said first portable computing device, whereby said first device sends an indication to said signaling server to request that said third device be included in a communication between said first and second devices so as to ensure that said second device receives media packets sent from said third device and that said third device receives media packets sent from said second device.

18. An article of manufacture comprising a computer program product, said computer program product comprising:
a tangible computer-readable recordable storage medium, storing in a non-transitory manner computer readable program code, the computer readable program code comprising:
computer readable program code configured to detect, at a first portable computing device, during a video chat between said first portable computing device and a second device, a gesture which indicates that media packets from said second device intended for said first device are to be sent to a third device; and
computer readable program code configured to, responsive to said detecting, send a flip signal from said first portable computing device to a signaling server, said flip signal indicating that said media packets from said second device intended for said first device are to be sent to said third device;
computer readable program code configured to, responsive to said signaling server receiving said flip signal, said signaling server sending a call request to said third device.

19. The article of manufacture of claim 18, further comprising computer readable program code configured to carry out a mixing function on said first portable computing device, whereby said first device sends an indication to said signaling server to request that said third device be included in a communication between said first and second devices so as to ensure that said second device receives media packets sent from said third device and that said third device receives media packets sent from said second device.

20. The method of claim 1, further comprising utilizing at least one component of said first device for providing at least one of audio input and video input from the first device to the second device during the video chat, while media packets from the second device otherwise intended for output on the first device are sent for presentation on said third device.

* * * * *